United States Patent
Kolev et al.

(10) Patent No.: US 11,601,326 B1
(45) Date of Patent: Mar. 7, 2023

(54) PROBLEM DETECTION AND CATEGORIZATION FOR INTEGRATION FLOWS

(71) Applicant: SAP SE, Walldorf (DE)

(72) Inventors: Mitko Kolev, Walldorf (DE); Markus Muenkel, Reilengen (DE); Stefan Opderbeck, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/487,939

(22) Filed: Sep. 28, 2021

(51) Int. Cl.
| | |
|---|---|
| *H04L 12/00* | (2006.01) |
| *H04L 41/0631* | (2022.01) |
| *H04L 41/0654* | (2022.01) |
| *H04L 41/069* | (2022.01) |
| *H04L 41/0604* | (2022.01) |

(52) U.S. Cl.
CPC .......... *H04L 41/065* (2013.01); *H04L 41/064* (2013.01); *H04L 41/069* (2013.01); *H04L 41/0613* (2013.01); *H04L 41/0654* (2013.01)

(58) Field of Classification Search
CPC . H04L 41/069; H04L 41/0654; H04L 41/064; H04L 41/0613; H04L 41/065
USPC .......................................... 709/223, 224–225
See application file for complete search history.

(56) References Cited

U.S. PATENT DOCUMENTS

| | | | | |
|---|---|---|---|---|
| 7,844,419 | B1 * | 11/2010 | Gurrieri | G06F 30/18 |
| | | | | 703/1 |
| 7,898,955 | B1 * | 3/2011 | Wang | H04L 45/70 |
| | | | | 370/235 |
| 11,237,896 | B2 * | 2/2022 | Guo | G06F 21/602 |
| 11,316,727 | B2 * | 4/2022 | Kushmerick | H04L 67/10 |
| 2012/0266013 | A1 * | 10/2012 | Shannon | H04L 41/08 |
| | | | | 714/E11.073 |
| 2013/0058221 | A1 * | 3/2013 | Andersen | H04W 24/08 |
| | | | | 370/242 |
| 2014/0149568 | A1 * | 5/2014 | Kruempelmann | H04L 43/0817 |
| | | | | 709/224 |
| 2017/0141984 | A1 * | 5/2017 | Seo | H04L 43/00 |

FOREIGN PATENT DOCUMENTS

EP 3605947 A1 * 2/2020 .......... G06F 11/0709

\* cited by examiner

*Primary Examiner* — Frantz Coby
(74) *Attorney, Agent, or Firm* — Buckley, Maschoff & Talwalkar LLC (57) ABSTRACT

A system and method to determine an event for an executing integration flow defining how messages are passed between a sender system and a receiver system; determine message processing states of messages of the integration flow before an event time; determine message processing states of messages of the integration flow after the event time; determine, based on an evaluation of failed message processing states for the messages before and after the event time, whether the event is associated with a problem; assign, in response to the determination that the event time is associated with a problem, one or more categories to the problem; and store a record of the assignment of the one or more categories to the problem.

20 Claims, 9 Drawing Sheets

PROBLEM DETECTION AND CATEGORIZATION FOR INTEGRATION FLOWS

BACKGROUND

An enterprise may use on-premises systems, a cloud computing environment, and combinations thereof to run applications and to provide services in a distributed computing environment. For example, cloud-based applications may be used to process purchase orders, handle human resources tasks, interact with customers, etc. Different systems might need to be integrated so that they can effectively communicate with each other in order to process various documents, requests, file transfers, and perform other tasks. In some conventional systems, a monitoring system and a person might be notified via an alert if a problem is detected in the integration between systems. Once alerted of a problem by the monitoring system, the person might try to determine the nature of the problem and further provide a solution to the problem based on, for example, their personal expertise and experience with the systems being monitored and the presented problem.

In some cases, a cloud provider or other entity may want to detect an anomaly or problem in applications currently executing in a distributed computing environment. For example, the provider might restart, provide additional computing resources to, for example, applications or other remedies in response to a detected anomaly or problem to improve performance. It would therefore be desirable to automatically detect and understand the root cause of a problem or anomaly in a distributed computing environment in an efficient and accurate manner.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

Figure 1:
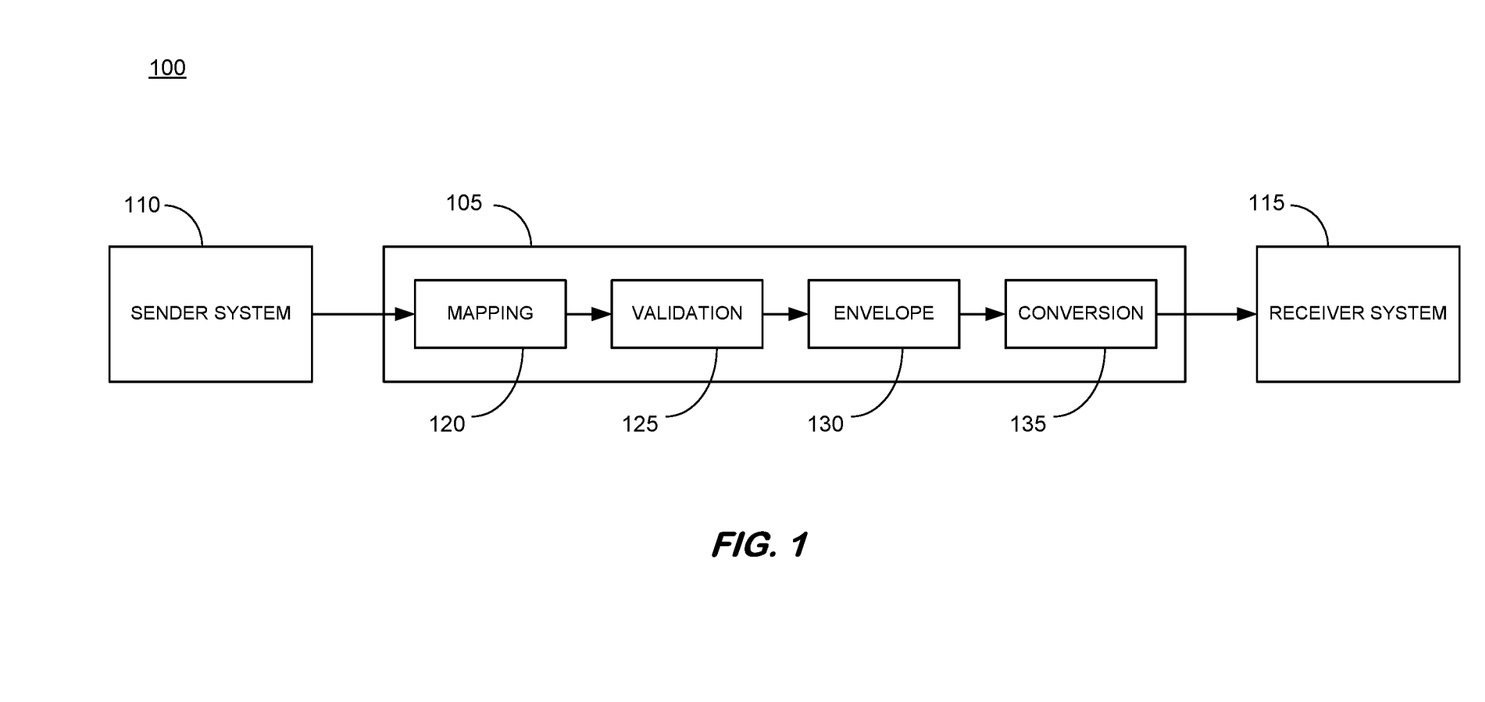
FIG. 1 is an illustrative depiction of an integration flow, in accordance with an example embodiment.

FIG. 1 is an illustrative depiction of an integration flow 105 between two systems executing different applications that need to communicate with each other, in accordance with an example embodiment. A sender system 110 and a receiver system 115 may need to communicate with each other to accomplish some tasks (e.g., purchase order processing, etc.), even though the applications executed by the two systems do not speak the same language. As used herein, an "integration scenario" is a context in which multiple applications need to interact (e.g., communicate) with each other. Integration middleware may be provided to facilitate integration between systems executing the multiple applications in an integration scenario. In some embodiments, a customer of the integration middleware may define an "integration flow" to integrate different applications applicable to their use cases. As used herein, an "integration flow" refers to a software instance for integrating multiple applications via message passing. Referring to FIG. 1, integration flow 105 may be defined by a tenant (i.e., a customer of integration middleware) in a multi-tenant cloud computing environment to specify how messages are integrated between systems such as, for example, the sender system 110 (e.g., a system of a buyer executing an application that submits a purchase order using a first communication protocol) and the receiver system 115 (e.g., a system of a seller executing an application that receives the purchase order using a second communication protocol). In some embodiments, each tenant may have multiple integration flows. Integration flow 105 may define features including mapping 120, validation 125, enveloping 130, and conversion 135 of the messages communicated between the sender system and the receiver system. In some aspects, an integration flow may be viewed as a bridge between two or more applications and it may contain multiple transformations, data aggregations, transactions and may use different transport/message exchange protocols.

The present disclosure relates to detecting problems in the context of integration middleware in a distributed computing environment. In some aspects, a challenge may be how to recover a dysfunctional integration flow and then how to quickly understand the cause of the problem so that the problem with the integration flow can be efficiently corrected. In some embodiments, the present disclosure provides a mechanism that reduces the operational complexity for operating large scale integration flow deployments via dimensionality reduction, as well as providing an indication of a root cause for the identified problems.

Various aspects of the present disclosure may be discussed herein in a multi-tenant cloud environment context. However, these and other aspects of the present disclosure are not limited to a multi-cloud tenant environment where multiple integrated applications are cloud-based. Accordingly, the various aspects and features disclosed herein may also be utilized in a hybrid configuration (i.e., a mix of cloud and on-premises applications) and an on-premises environment, unless specifically stated otherwise. In some aspects, in a cloud environment including many different tenants (e.g., greater than 20,000 tenants), each executing multiple information flows (e.g., 40 different integration flows, on average), a greater efficiency and scalability might be realized. However, some embodiments are not constrained to a cloud environment, unless stated otherwise.

As introduced above, integration flows may be implemented on the basis of passing messages between two systems. In general, two systems might communicate via messages, where a sender system prepares a message having a header and a body that is sent to another, receiver system that receives the message. In some embodiments, a monitoring system and process herein may evaluate a rate of successfully processed messages, per integration flow.

Figure 2:
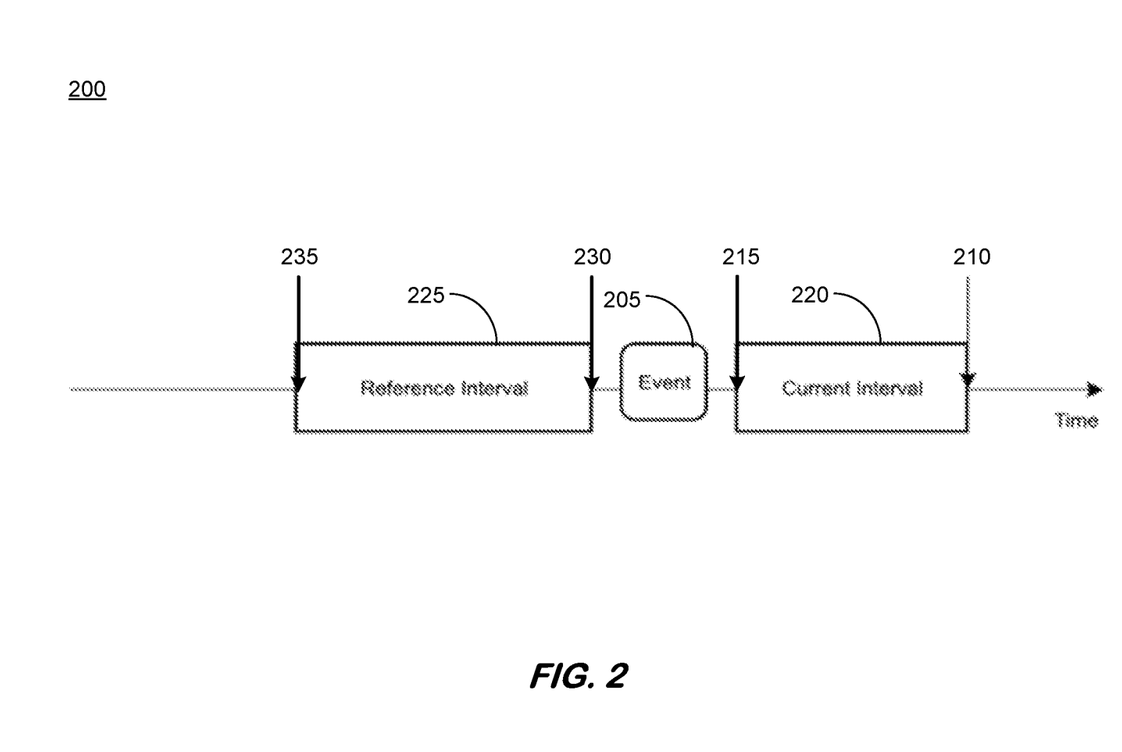
FIG. 2 is an illustrative depiction of a moving time window for detecting a problem in an integration flow, in accordance with an example embodiment.

FIG. 2 is an illustrative depiction of a moving time window framework 200 for detecting a problem in an integration flow, in accordance with an example embodiment. In the context of a multi-tenant cloud environment including thousands of tenants, each defining multiple different integration flows, there may be a moving window as shown in FIG. 2 for each integration flow for each tenant. FIG. 2 shows an event at 205. As used herein, an "event" is a point in time (i.e., a "turning point" or "change point") where an integration flow is found to get worse in terms of successfully processed messages. An "event" may be within, for example, a software update of the middleware, a planned network maintenance, or other change occurrences. In the example of a planned network maintenance or known software update, these changes would be the event attributed to or associated with the problem. A current interval 220 of time is shown extending from a current time (T) 210 back to time 215 (e.g., T−1 hour). Additionally, a reference interval 225 of time is shown as extending from time 230 back to time 235 (e.g., (T−2 hour, T−1 hour)). In some embodiments, message processing states of messages in the current interval 220 (i.e., after event 205) are compared to message processing states of messages in the reference interval (i.e., before event 205) in a moving time window. If the comparison determines there is a significant increase in message failures in the current interval 220 relative to the reference interval 225, then failed messages detected in the current interval may be attributed to event 205 and a problem object may be created for event 205. As used herein, a problem object is a structured data record that represents a significant increase in failed messages for an event associated with the problem object. Accordingly, a new problem object is not created for failures that were already observed in the reference interval (and before).

In some instances, an event or change point may be associated with one or more of a software update of the integration middleware framework, a change to an integration flow, a network change, and a infrastructure change.

As an example, event 205 might correspond to a middleware software update, where the software was executing properly and the middleware software was updated at some point in time (i.e., the event). An analysis of message states after the software update event during a current interval of time can be compared to an analysis of message states during an interval of time before the software update (i.e., during a reference interval), to determine whether message failures increased significantly after the software update event. Note that this message state analysis may be performed for each integration flow. In the instance the message failures after the software update event significantly increased relative to the failed messages in the reference interval before the software update event, then the software update event can be deemed to have caused the problem for some reason (not yet determined). As illustrated by this example, the event is not static.

Figure 3:
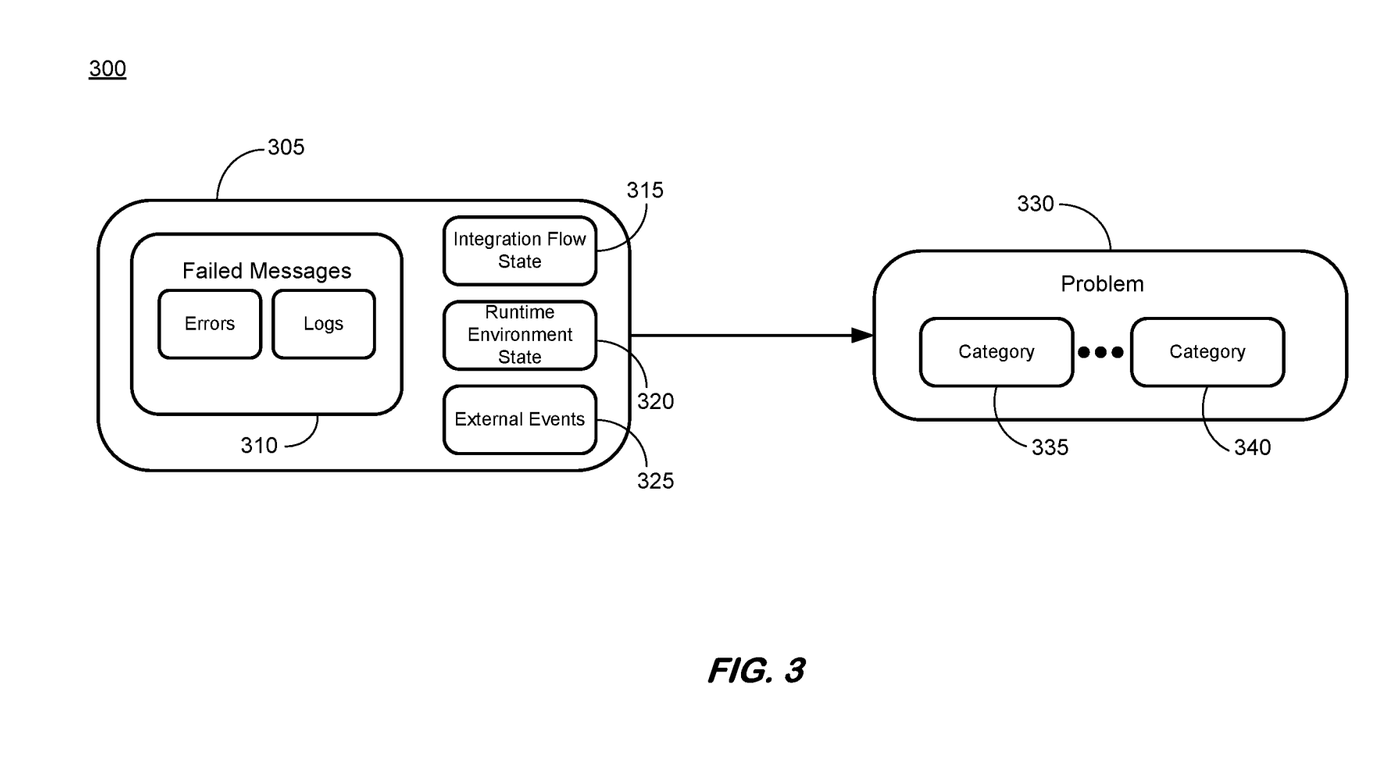
FIG. 3 is an illustrative depiction of some aspects of a problem object, in accordance with an example embodiment.

FIG. 3 is an illustrative depiction 300 including some aspects of a problem object, in accordance with an example embodiment. Problem object 305, a structured data record representing a determined significant increase in failed messages for an event, is shown as including the errors and logs associated with the failed messages 310. Message errors include an indication of whether the message failed or could not be delivered. Message logs include information representing what happened to a message before it was sent (e.g., the header was updated, the body of the message was changed in some manner, etc.) and may provide context regarding the errors of the message. The context of the event may be represented by the reference interval, the current interval, and a description or indication of the event that provides a description or context of what the event is and when it happened. If a timestamp of the event is between the reference interval and the current interval, then that event is attributed to the problem. Problem object 305 further includes an integration flow state 315 (e.g., active or inactive) and a runtime environment state 320. As used herein, a problem object having an active integration flow state indicates a problem currently exists with the integration flow, whereas a problem object having an inactive integration flow state indicates a problem existed at some previous point in time, but now the integration flow currently functions fine. Additionally, problem object 305 may further include information 325 about external events that may be relevant, including, for example, software updates, network maintenance status, integration flow changes that can be provided from the middleware, etc.

In some aspects, the present disclosure refers to a detection of a "significant" increase of failed messages. Some embodiments herein are related to and concerned with increases in failed messages of integration flows that are impactful to the operation of the integration flows. Accordingly, the term "significant" increase of failed messages is analogous to an "impactful" increase in failed messages that negatively affects an integration flow. For example, embodiments herein might not be interested in or concerned with the failure of individual messages since, for example, a failure of 1 out of 100 messages is not significant to impact or disrupt the operation of an integration flow (even though the failed message will have to be resent). However, 40 out of 100 messages indicating a service is unreachable might compromise an integration flow to the extent that it no longer functions at an acceptable level. In some embodiments, an increase in failed messages after an event of about at least 20% relative to failed messages in a reference interval before the event is indicative of the event causing a problem. In some other embodiments, an increase in failed messages after an event of about at least 40% relative to failed messages in a reference interval before the event is indicative of the event triggering the creation of a problem. In some embodiments, the value of 40% might be selectively adjusted, based on, for example, a desired quality of service for a particular integration flow. For example, in a use case where every message is considered important for a particular integration flow, a threshold of 2% might be set for that integration flow, or for the tenant.

A problem object might be viewed, in some aspects, as a problem abstraction since it aids in reducing the dimensions for classification of a root cause for the problem represented by the problem object. A problem object reflects the fact that a distribution of a significant increase in failed messages was detected after an event. The problem object includes contextual information for the problem, though it may not be specific to a specific type of problem. In this manner, a problem object is abstract. That is, the problem object is agnostic to any concrete failure semantics. The contextual information included in the problem object may be used in a categorization process 330 to assign one or more categories 335 and 340 to problem object 305. Categorization of detected problems will be described in greater detail below.

Figure 4:
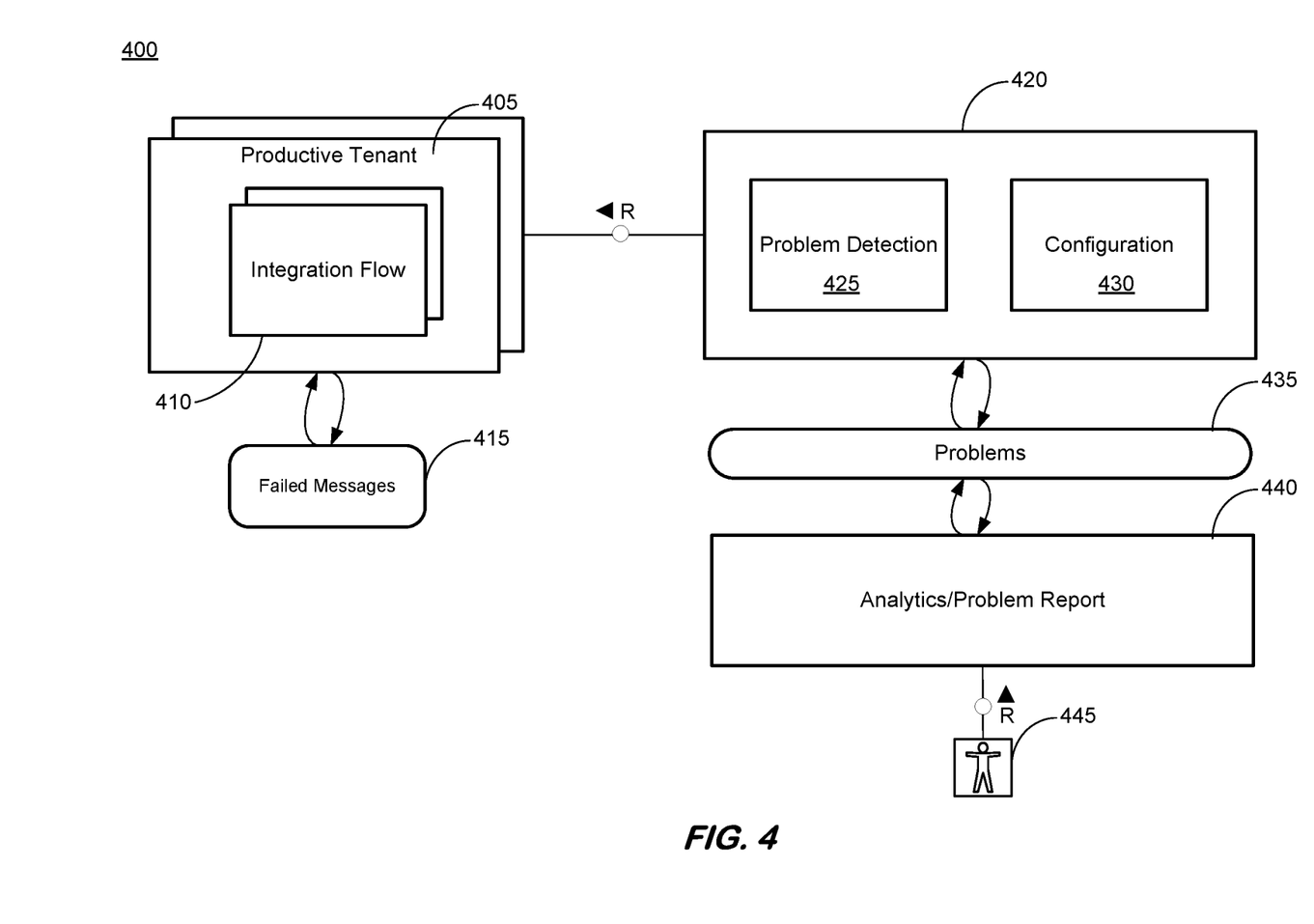
FIG. 4 is an illustrative block diagram of an architecture associated with detection and characterization of integration flows, in accordance with an example embodiment.

FIG. 4 is an illustrative block diagram 400 of an architecture associated with detection and characterization of problems for an integration flow, in accordance with an example embodiment. Architecture or framework 400 includes an example of a productive tenant 405 having defined a number of integration flows 410 that integrate multiple applications (not shown) and failed messages 415. System or service 420 includes a problem detection component 425 that reads information associated with failed messages 415 to determine whether a change or event introduced a problem based on a comparison of the failed message before and after the event, and creates a problem object (i.e., structured data record) representation for the detected problem. The problem object is stored in a data repository 435. System or service 420 also includes a categorization component 430 that assigns one or more categories to the problem objects created by the problem detection component 425. As used herein, categorization of a problem refers to determining a root cause of the problem and may include a change related to the problem and an action to correct or address the problem. In some embodiments, personnel 445 might review a report or other analytics 440 of a problem based on the categories assigned to the problem. In some instances, the analytics/problem report might include, for example, a summary of the detected problems, the number of tenants impacted by the problems, actions to take to rectify the problems, verification resolutions for the problems, etc.

Figure 5:
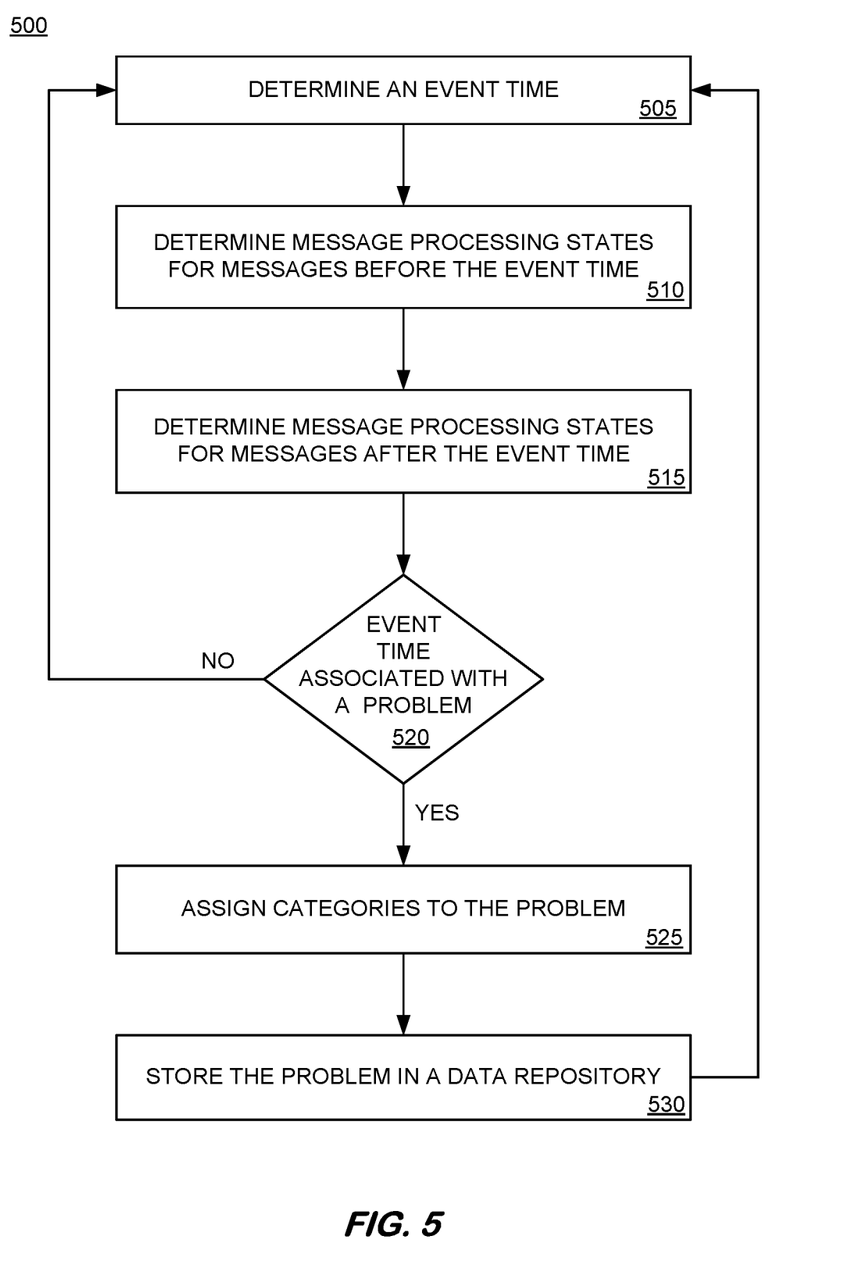
FIG. 5 is an illustrative flow diagram of a process, in accordance with an example embodiment.

FIG. 5 is an illustrative flow diagram of a process 500, in accordance with an example embodiment. Process 500 demonstrates, at least in part, how aspects and features of a moving or sliding window analysis framework disclosed herein might operate. At operation 505, the time of occurrence for an event (i.e., a "change point") is determined. The event time determined at operation 505 may include associating, for "known" changes (e.g., a software update, a planned integration flow deployment by a customer, a scheduled system maintenance, etc.) the event time to a timestamp corresponding to the known change occurrence. In some instances, the determination of the event time at operation 505 may involve using a moving time window as disclosed herein to detect the occurrence of a change (i.e., an increase in failed messages for an integration flow), including an establishing reference interval (e.g., ($T_{now}$–2 hour, $T_{now}$–1 hour)) and a current interval (e.g., ($T_{now}$–1 hour, now)), wherein the current interval window advances, for example, every 5 minutes or some other increment of time.

In some instances, if there is a new active problem for an integration flow, the reference interval is not moved and only the current interval is moved. In this way, the current interval will be compared with the initial reference interval used to create the problem.

At operation 510, message processing states for messages of the integration flow before the event time determined/set at operation 505 are determined. Operation 510 may include reading the errors associated with the messages of the integration flow before the event time.

Operation 515 includes determining message processing states for messages of the integration flow after the event time determined/set at operation 505. Operation 515 might include reading the errors associated with the messages of the integration flow after the event time.

At operation 520, a determination is executed based on an evaluation of failed message processing states for the messages before the event time and failed message processing states for the messages after the event time to determine whether the event time is associated with a problem. As previously discussed, a problem is indicated by an impactful or significant increase in failed messages after the event time relative to failed messages before the event time. In some instances, an increase in failed messages by more than 40% compared to the messages in the reference interval is indicative of a problem caused by the change associated with the event time.

In some embodiments, if the rate of failed messages in a current interval for an existing problem decreases so that there is no significant difference relative to the reference interval, then that particular problem is set as inactive. An inactive problem might be used to detect infrastructure events that lead to failed messages. For example, an infrastructure outage might produce problems for many tenants at roughly the same time. Accordingly, these same problems would also be set to "inactive" at approximately the same time. These particular problems would also have the same associated categories, as the errors associated with all of the failed messages would be similar.

If the event time is not associated with a problem (i.e., a significant increase in failed messages for the integration flow) at operation 520, then process 500 returns to operation 505 to consider a next event time. In the instance the event time is associated with a problem as determined at operation 520, then process 500 advances to operation 525 that functions to automatically assign one or more categories indicative of a particular type of problem and root cause thereof (i.e., semantics). Note that for "known" changes associated with an event time (e.g., a software update, a planned integration flow deployment by a customer, a scheduled system maintenance, etc.), the assigning of categories is not performed since the cause of the problem is already known.

Problems having categories assigned thereto at operation 525 may be stored in a data repository at operation 530. Problems with assigned categories indicative of a particular type of problem and root cause thereof may be referred to as being actionable since an action may be determined, associated with, or assigned to the identified root cause of the problem.

Figure 6:
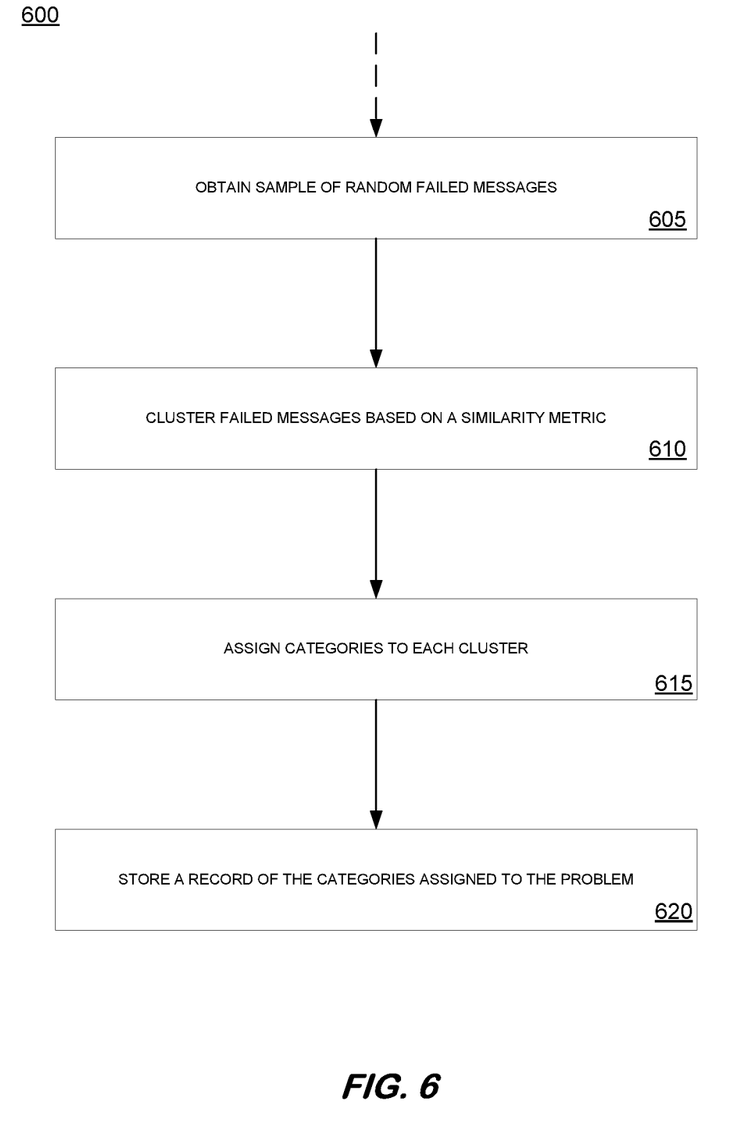
FIG. 6 is an illustrative flow diagram of an auto-categorization process, in accordance with an example embodiment.

FIG. 6 is an illustrative flow diagram 600 of an auto-categorization process, in accordance with an example embodiment. In some embodiments, process 600 may relate to an implementation of operation 525 of FIG. 5. At operation 605, a sample of random failed messages, per problem, is obtained for the current interval. In some embodiments, "per problem" refers to one problem for a particular tenant and integration flow. For example, instead of evaluating all of 100 failed error messages, a sampling of 10 of the failed messages may be randomly selected within the current interval at operation 605. For each selected failed message, problem metadata may be extracted from the problem object for the problem, including message error text, message metadata, and message logs.

At operation 610, the random sample of failed messages may be grouped into one or more clusters based on a similarity metric applied to the sampled failed messages. In some embodiments, the sampled failed messages might be clustered by similarity with, for example, a weighted Jaccard string similarity metric. Metadata text of the failed messages may be used as an input that is parsed into words and the metric might determine how much the words overlap, where some words may be considered important if included and are given more weight for the similarity (e.g., like Exception, Http Status Code, etc.). In some embodiments, an unsupervised clustering algorithm may be used to determine the clusters (e.g., K-Means, with the Jaccard string similarity metric mentioned above, etc.). In some embodiments, machine learning may be utilized to implement the application of a similarity metric herein, including the execution of one or more trained machine learning models.

In some aspects, a clustering feature herein may be used to reduce the complexity (i.e., dimensionality) of understanding the root cause of the failed messages by using categories, wherein the categories may be treated as equivalent classes. Once a cluster is determined, one message of the cluster is selected to represent the entire cluster and proceed with it to the next step.

At operation 615, meaning is assigned to the determined clusters by assigning categories to the clusters. In some embodiments, one failed message, including its error logs and associated metadata, is selected from each cluster as a representative element of that cluster. Further, existing categories are reviewed to assign a semantic to the cluster thereby providing meaning to what the clusters signify, based on a similarity metric. The similarity metric used at operation 615 may be the same as the similarity metric used in operation 610. If categories are discovered for a cluster with a similarity more than, for example, 0.8 based on the similarity metric for that element, then that category is assigned to the cluster. In some embodiments, other values (i.e., other than 0.8) may be determined and used to indicate sufficient similarity between a potential category and the representative failed message to assign the category to the failed message. In some instances, a problem may have more than one category assigned thereto.

In some embodiments, an output of the category assignment operation 615 is a record including a set of categories assigned to the problem. The record of the one or more categories assigned to the problem being stored in a data repository (e.g., database) is illustrated at operation 620.

Figure 7:
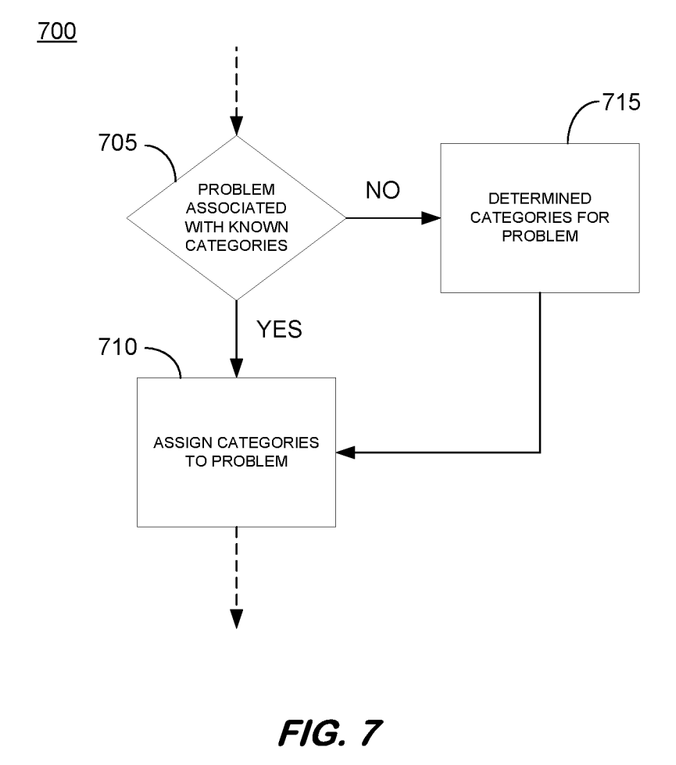
FIG. 7 is an illustrative flow diagram of exception handling for an auto-categorization process, in accordance with an example embodiment.

In some instances, if no existing (i.e., known) category is found at operation 615, then a new category may be created to assign to the problem being evaluated. FIG. 7 is an illustrative flow diagram of an auto-categorization exception handling process 700, in accordance with an example embodiment. In some instances, process 700 may relate to an implementation of operation 615 of FIG. 6. At operation 705, a determination is made that the problem is not associated with any known categories. For example, the similarity metric applied to the representative element selected from a cluster does not result in any matches with known, existing categories. Consequently, process 700 advances to operation 715 where a human expert might intervene to create a new one or more categories to associate with the problem (i.e., exception handling). The newly created categories may be assigned to the problem and all other problems that have this new category at 710 and further stored as a record (e.g., FIG. 6, operation 620) so that the exception handling of operation 715 need only be performed once for a particular problem.

If the determination at operation 705 indicates the problem is associated with known categories, then the known categories determined to match the problem are assigned to the problem at operation 710 (similar to operation 615 of FIG. 6).

In some aspects, processes disclosed herein provide a reduction in categorization dimensions based on the disclosed problem abstraction (e.g., FIG. 3) including a select set of dimensions and an application of a similarity metric to only certain error messages (e.g., selected samples for clustering and a representative message per cluster for categorization, FIGS. 5 and 6). In this manner, some embodiments herein may scale well with the arbitrary size of cloud deployments since, for example, categories assigned to detected problems are reused if they match the problem's associated metadata.

Figure 8:
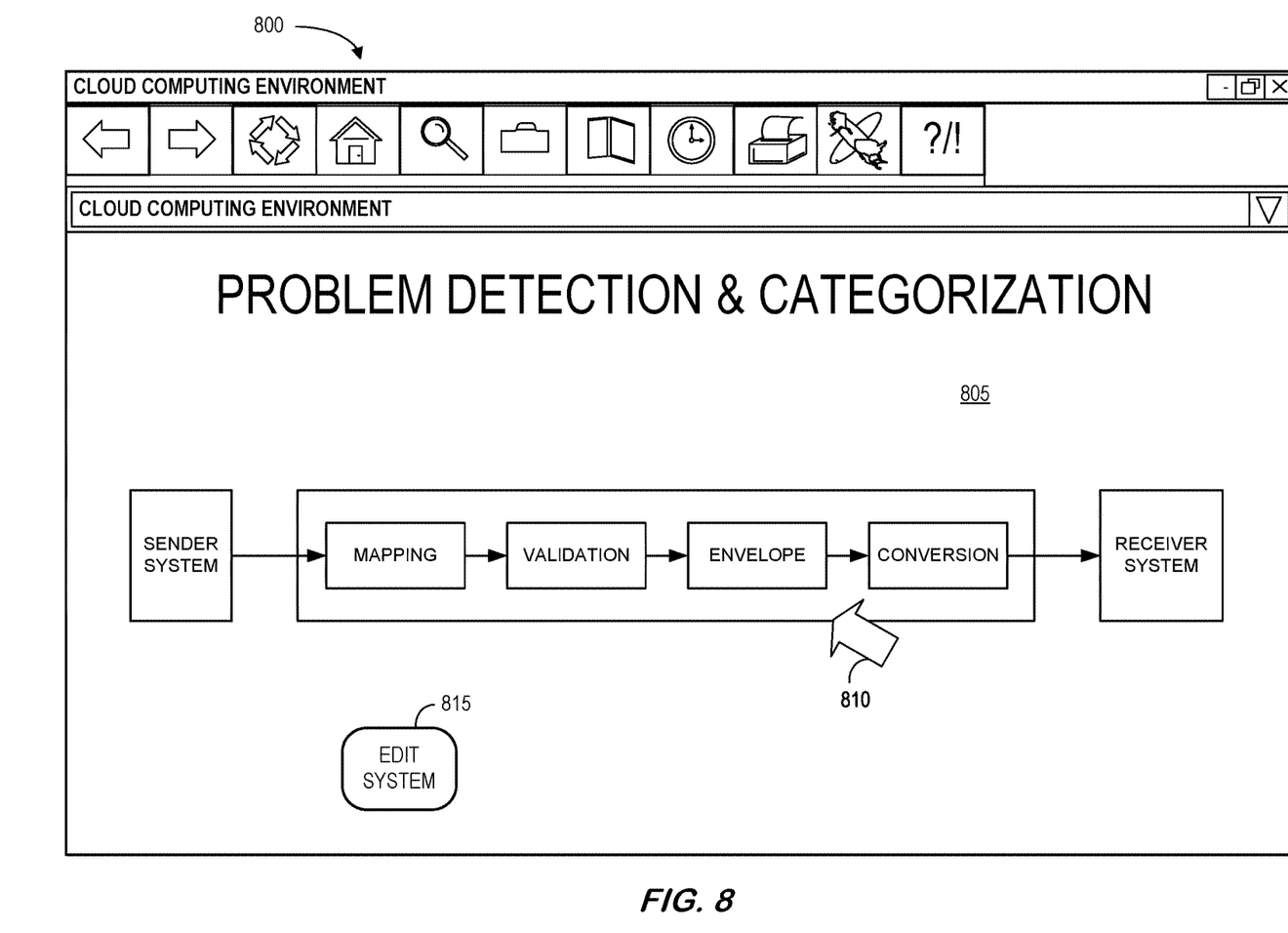
FIG. 8 is an outward facing user interface related to a system and process for detection and characterization of for integration scenarios, in accordance with an example embodiment.

FIG. 8 is an outward-facing user interface related to a system and process for detection and characterization of integration flows, in accordance with an example embodiment. FIG. 8 is a human-machine interface display 800 in accordance with some embodiments. The display 800 includes a graphical representation 805 or dashboard that might be used to manage or monitor a problem detection and characterization of integration flows (e.g., associated with a multi-tenant cloud provider). In particular, selection of an element (e.g., an integration flow via a touchscreen or computer mouse pointer 810) might result in the display of a popup window that contains configuration data. Display 800 may also include a user selectable "Edit System" icon 815 to request system changes (e.g., to investigate problems associated with integration or improve system performance).

Figure 9:
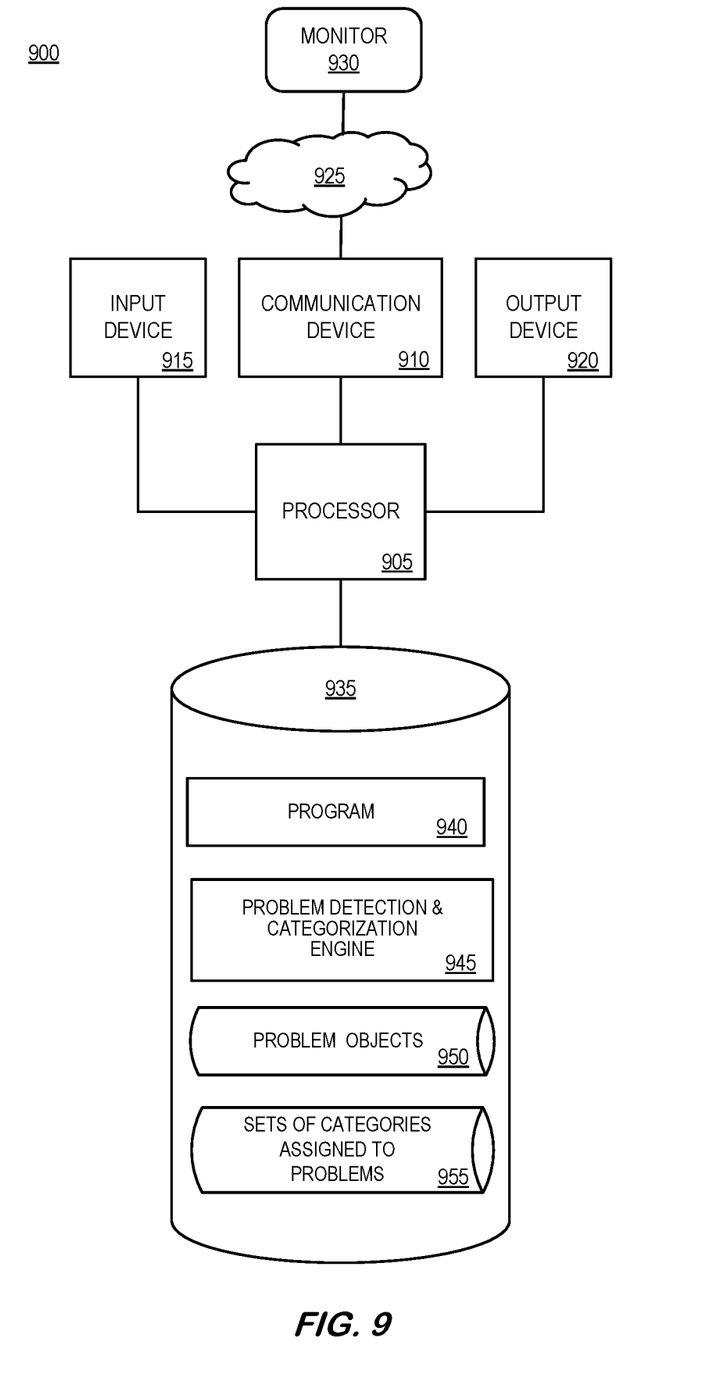
FIG. 9 is an illustrative block diagram of an apparatus or platform, in accordance with an example embodiment.

FIG. 9 is an illustrative block diagram of an apparatus or platform, in accordance with an example embodiment. Note that the embodiments described herein may be implemented using any number of different hardware configurations. For example, FIG. 9 is a block diagram of an apparatus or platform 900 that may be, for example, associated with system 400 of FIG. 4 (and any other system described herein). Platform 900 comprises a processor 905, such as one or more commercially available CPUs in the form of one-chip microprocessors, coupled to a communication device 910 configured to communicate via a communication network (not shown in FIG. 9). Communication device 910 may be used to communicate, for example, with one or more remote user platforms or a monitor 930 (e.g., that monitors for integration problems) via a communication network 925. Platform 900 further includes an input device 915 (e.g., a computer mouse, a keyboard, etc.) and an output device 920 (e.g., a computer monitor to render a display, transmit recommendations or alerts, create monitoring reports, etc.). According to some embodiments, a mobile device, PC, and other devices may be used to exchange data with platform 900.

Processor 905 also communicates with a storage device 935. Storage device 935 can be implemented as a single database or the different components of storage device 935 can be distributed using multiple databases (that is, different deployment data storage options are possible). Storage device 935 may comprise any appropriate data storage device, including combinations of magnetic storage devices (e.g., a hard disk drive), optical storage devices, mobile telephones, and semiconductor memory devices. Storage device 935 stores a program 940 and problem detection and characterization engine 945 for controlling the processor 905. Processor 905 performs instructions of the programs 940, 945, and thereby operates in accordance with any of the embodiments described herein (e.g., FIGS. 5-7).

Programs 940, 945 may be stored in a compressed, uncompiled, encrypted, and other configured format. Programs 940, 945 may furthermore include other program elements, such as an operating system, clipboard application, a database management system, and device drivers used by processor 905 to interface with peripheral devices.

As used herein, data may be "received" by or "transmitted" to, for example: (i) the platform 900 from another device; or (ii) a software application or module within the platform 900 from another software application, module, or any other source.

In some embodiments (such as the one shown in FIG. 9), storage device 935 further stores the problem objects 950 and sets of categories assigned to problems 955.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and any other non-transitory transmitting or receiving medium such as the Internet, cloud storage, the Internet of Things (IoT), or other communication network or link. The article of manufacture containing the computer code may be made and used by executing the code directly from one medium, by copying the code from one medium to another medium, or by transmitting the code over a network.

The computer programs (also referred to as programs, software, software applications, "apps", or code) may include, for example, machine instructions for a programmable processor, and may be implemented in a high-level procedural, object-oriented programming language, assembly/machine language, etc. As used herein, the terms "machine-readable medium" and "computer-readable medium" refer to any computer program product, apparatus, cloud storage, Internet of Things, and device (e.g., magnetic discs, optical disks, memory, programmable logic devices (PLDs)) used to provide machine instructions and data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processor to execute the processor-executable program code in order to cause the system to:
   determine an event time associated with an event for an executing integration flow, the integration flow defining how messages are passed between a sender system and a receiver system and the event being an occurrence of a point in time where messages successfully processed by the integration flow decreases;
   determine message processing states for messages of the integration flow before the event time;
   determine message processing states for messages of the integration flow after the event time;
   determine, based on an evaluation of failed message processing states for the messages before the event time and failed message processing states for the messages after the event time, whether the event is associated with a problem, the problem indicated by an impactful increase in failed messages after the event time relative to failed messages before the event time;
   assign, in response to the determination that the event time is associated with a problem, one or more categories to the problem; and
   store a record of the assignment of the one or more categories to the problem in a data repository.

2. The system of claim 1, wherein the determining of the event time for the executing integration flow includes at least one of setting the event to a point in time corresponding to a known change and determining the occurrence of the event based on a moving window of time analysis of messages processed by the integration flow.

3. The system of claim 1, wherein the impactful increase in failed messages is indicated by an increase of about at least 15 percent in failed message processing states for the messages after the event relative to the messages before the event.

4. The system of claim 3, wherein the impactful increase in failed messages is indicated by an increase of about at least 40 percent in failed message processing states for the messages after the event relative to the messages before the event.

5. The system of claim 1, wherein the processor is further configured to execute the processor-executable program code in order to cause the system to:
   create, in response to the determination that the event time is associated with the problem, a problem object for the problem, the problem object being a structured data record including data values for (1) errors associated with a message, (ii) logs associated with the message, (iii) an integration flow state associated with the message, and (iv) a runtime environment state.

6. The system of claim 1, wherein the assignment of the one or more categories to the problem comprises:

obtaining a random sample of failed messages for the problem, the failed messages selected from the messages after the event time;

determining at least one cluster for the sampled failed messages based on a similarity metric applied to the sampled failed messages;

assigning one or more of the categories to each of the determined clusters, based on one representative failed message selected from each respective cluster; and storing a record including the one or more categories assigned to the problem.

7. The system of claim 6, wherein the assigning of the one or more of the categories to each of the determined clusters is further based on an application of the similarity metric to the one representative failed message selected from each respective cluster.

8. The system of claim 6, wherein the application of the similarity metric to the sampled failed messages is based on a determined similarity in metadata extracted from the failed messages.

9. A computer-implemented method, the method comprising:

determining, by a processor, an event time associated with an event for an executing integration flow, the integration flow defining how messages are passed between a sender system and a receiver system and the event being an occurrence of a point in time where messages successfully processed by the integration flow decreases;

determining, by the processor, message processing states for messages of the integration flow before the event time;

determining, by the processor, message processing states for messages of the integration flow after the event time;

determining, by the processor based on an evaluation of failed message processing states for the messages before the event time and failed message processing states for the messages after the event time, whether the event is associated with a problem, the problem indicated by an impactful increase in failed messages after the event time relative to failed messages before the event time;

assigning, by the processor in response to the determination that the event time is associated with a problem, one or more categories to the problem; and storing a record of the assignment of the one or more categories to the problem in a data repository.

10. The method of claim 9, wherein the determining of the event time for the executing integration flow includes at least one of setting the event to a point in time corresponding to a known change and determining the occurrence of the event based on a moving window of time analysis of messages processed by the integration flow.

11. The method of claim 9, wherein the impactful increase in failed messages is indicated by an increase of about at least 15 percent in failed message processing states for the messages after the event relative to the messages before the event.

12. The method of claim 9, further comprising:

creating, by the processor in response to the determination that the event caused the problem, a problem object for the problem, the problem object being a structured data record including data values for (1) errors associated with a message, (ii) logs associated with the message, (iii) an integration flow state associated with the message, and (iv) a runtime environment state.

13. The method of claim 9, wherein the assignment of the one or more categories to the problem comprises:

obtaining a random sample of failed messages for the problem, the failed messages selected from the messages after the event time;

determining at least one cluster for the sampled failed messages based on a similarity metric applied to the sampled failed messages;

assigning one or more of the categories to each of the determined clusters, based on one representative failed message selected from each respective cluster; and storing a record including the one or more categories assigned to the problem.

14. The method of claim 13, wherein the assigning of the one or more of the categories to each of the determined clusters is further based on an application of the similarity metric to the one representative failed message selected from each respective cluster.

15. A non-transitory, computer readable medium storing instructions, which when executed by at least one processor cause a computer to perform a method comprising:

determining, by a processor, an event time associated with an event for an executing integration flow, the integration flow defining how messages are passed between a sender system and a receiver system and the event being an occurrence of a point in time where messages successfully processed by the integration flow decreases;

determining, by the processor, message processing states for messages of the integration flow before the event time;

determining, by the processor, message processing states for messages of the integration flow after the event time;

determining, by the processor based on an evaluation of failed message processing states for the messages before the event time and failed message processing states for the messages after the event time, whether the event time is associated with a problem, the problem indicated by an impactful increase in failed messages after the event time relative to failed messages before the event time;

assigning, by the processor in response to the determination that the event time is associated with a problem, one or more categories to the problem; and storing a record of the assignment of the one or more categories to the problem in a data repository.

16. The medium of claim 15, wherein the determining of the event time for the executing integration flow includes at least one of setting the event to a point in time corresponding to a known change and determining the occurrence of the event based on a moving window of time analysis of messages processed by the integration flow.

17. The medium of claim 15, wherein the impactful increase in failed messages is indicated by an increase of about at least 15 percent in failed message processing states for the messages after the event relative to the messages before the event.

18. The medium of claim 15, comprising computer readable medium storing instructions, which when executed by at least one processor cause a computer to perform a method further comprising:

creating, by the processor in response to the determination that the event time is associated with the problem, a problem object for the problem, the problem object being a structured data record including data values for (1) errors associated with a message, (ii) logs associated with the message, (iii) an integration flow state associated with the message, and (iv) a runtime environment state.

19. The medium of claim 15, wherein the assignment of the one or more categories to the problem comprises:
  obtaining a random sample of failed messages for the problem, the failed messages selected from the messages after the event time;
  determining at least one cluster for the sampled failed messages based on a similarity metric applied to the sampled failed messages;
  assigning one or more of the categories to each of the determined clusters, based on one representative failed message selected from each respective cluster; and
  storing a record including the one or more categories assigned to the problem.

20. The medium of claim 19, wherein the assigning of the one or more of the categories to each of the determined clusters is further based on an application of the similarity metric to the one representative failed message selected from each respective cluster.

* * * * *